(12) United States Patent
Canada et al.

(10) Patent No.: US 11,436,335 B2
(45) Date of Patent: Sep. 6, 2022

(54) METHOD AND SYSTEM FOR NEURAL NETWORK BASED DATA ANALYTICS IN SOFTWARE SECURITY VULNERABILITY TESTING

(71) Applicant: Ventech Solutions, Inc., Columbus, OH (US)

(72) Inventors: Matthew Canada, Rosedale, MD (US); Jerry Allen Craig, II, Knoxville, TN (US); Kathrine Dass, Severna Park, MD (US); Raja Krishnamurthy, Lewis Center, OH (US); David Anthony Rigsby, Heath, OH (US); Richard Nathan Toney, Windsor Mill, MD (US); Stephen J. Veneruso, Columbus, OH (US)

(73) Assignee: Ventech Solutions, Inc., Columbus, OH (US)

( * ) Notice: Subject to any disclaimer, the term of this patent is extended or adjusted under 35 U.S.C. 154(b) by 506 days.

(21) Appl. No.: 16/525,252

(22) Filed: Jul. 29, 2019

(65) Prior Publication Data
US 2021/0034753 A1 Feb. 4, 2021

(51) Int. Cl.
| G06F 21/00 | (2013.01) |
| G06F 21/57 | (2013.01) |
| G06N 3/08 | (2006.01) |
| G06F 21/52 | (2013.01) |
| G06K 9/62 | (2022.01) |
| G06F 17/16 | (2006.01) |

(52) U.S. Cl.
CPC ............ *G06F 21/577* (2013.01); *G06F 17/16* (2013.01); *G06F 21/52* (2013.01); *G06K 9/6267* (2013.01); *G06N 3/084* (2013.01)

(58) Field of Classification Search
CPC ........ G06F 17/16; G06F 21/52; G06F 21/577; G06K 9/6267; G06N 3/084
See application file for complete search history.

(56) References Cited

U.S. PATENT DOCUMENTS

| 8,806,647 | B1 | 8/2014 | Daswani |
| 2013/0227695 | A1 | 8/2013 | Mohanakrishnan |
| 2013/0232472 | A1 | 9/2013 | Korner |
| 2013/0290322 | A1 | 10/2013 | Prosnitz |
| 2018/0288086 | A1* | 10/2018 | Amiri ...................... G06N 3/08 |

* cited by examiner

*Primary Examiner* — Jeffrey C Pwu
*Assistant Examiner* — Thong P Truong
(74) *Attorney, Agent, or Firm* — Mahamedi IP Law LLP

(57) ABSTRACT

A method and system for implementing AI based neural networks for data analytics in dynamic testing of security vulnerability of cloud-based enterprise software applications. The method comprises directing, to a software program under execution, a series of attack vectors; diagnosing an at least a first set of results associated with the software program under execution as comprising one of a security vulnerability and not a security vulnerability, the at least a first set of results produced based at least in part on the attack vectors; and training a machine learning neural network classifier in accordance with a supervised classification that identifies false positive vulnerability defects of the at least a first set of results to produce a trained classifier, the neural network classifier including an input and an output layers connected via at least one intermediate layer that is configured in accordance with an initial matrix of weights.

16 Claims, 3 Drawing Sheets

300

310
Direct, to a software program under execution, a series of attack vectors

320
Diagnosing a set of results associated with the software program under execution as comprising one of a security vulnerability and not a security vulnerability, the set of results produced based at least in part on the attack vectors

330
Training a machine learning neural network classifier in accordance with a supervised classification that identifies false positive vulnerability defects of results to produce a trained classifier, the neural network classifier including input and output layers connected via one or more intermediate layers configured according to an initial matrix of weights

340
Based on deploying results of a subsequent dynamic testing case to an input layer of the trained classifier, identifying a set of software security vulnerability defects generated in accordance with an output layer of the trained classifier

FIG. 3

METHOD AND SYSTEM FOR NEURAL NETWORK BASED DATA ANALYTICS IN SOFTWARE SECURITY VULNERABILITY TESTING

TECHNICAL FIELD

The disclosure herein relates to neural network systems for data analytics related to security vulnerability testing of web-based enterprise software applications and websites.

BACKGROUND

Protection of safety-critical software platform infrastructures and systems employed in healthcare, telecommunications, banking, and other commercial and industrial uses remains a major challenge. In particular, cyberattacks can be unpredictable, and intended to compromise or inhibit secure operation of an infrastructure or a critical component within the infrastructure. Computer viruses, trojans, hackers, cryptographic key recovery attacks, malicious executables and bots may present a constant threat to users of computers connected to public computer networks such as the Internet and also private networks such as corporate computer networks. In response to these threats, enterprise organizations may deploy antivirus software and firewalls. However, such preventative attempts may not always prove adequate.

For enterprise organizations deploying safety-critical cloud-based software system infrastructure and components, it is important to ensure that enterprise software applications and systems operate in a secure way and are robust and resilient with regard to cyberattacks performed via a data network. However, often the necessary software security data analytic structure and solution may be inadequate to assess current security aspects of a software system as deployed.

Accurate identification of software security vulnerability defects in dynamic testing of software applications under execution remains a challenge. In particular, the incidence of false positives, a situation when a dynamic testing result wrongly indicates that a security vulnerability defect is present when in reality it is not, is relatively common. Inaccurate data analytics of software security dynamic testing drastically degrades the usefulness of the testing and diagnostic tools and techniques, with a not uncommon result that an organization may spending more time sifting through false positives than actually fixing security vulnerabilities. The prevalence of false positives often leads to disabling several security tests just to avoid the false positives, and promotes a false sense of security in the face of security vulnerabilities. Solutions are required to protect enterprise and customer critical data from external threats by ensuring integrity of the software systems and applications used in conducting web based commerce.

BRIEF DESCRIPTION OF THE DRAWINGS

FIG. 3 illustrates a method of operation, in one example embodiment, of a system for software security vulnerability data analytics in dynamic testing of software applications.

DETAILED DESCRIPTION

Figure 1:
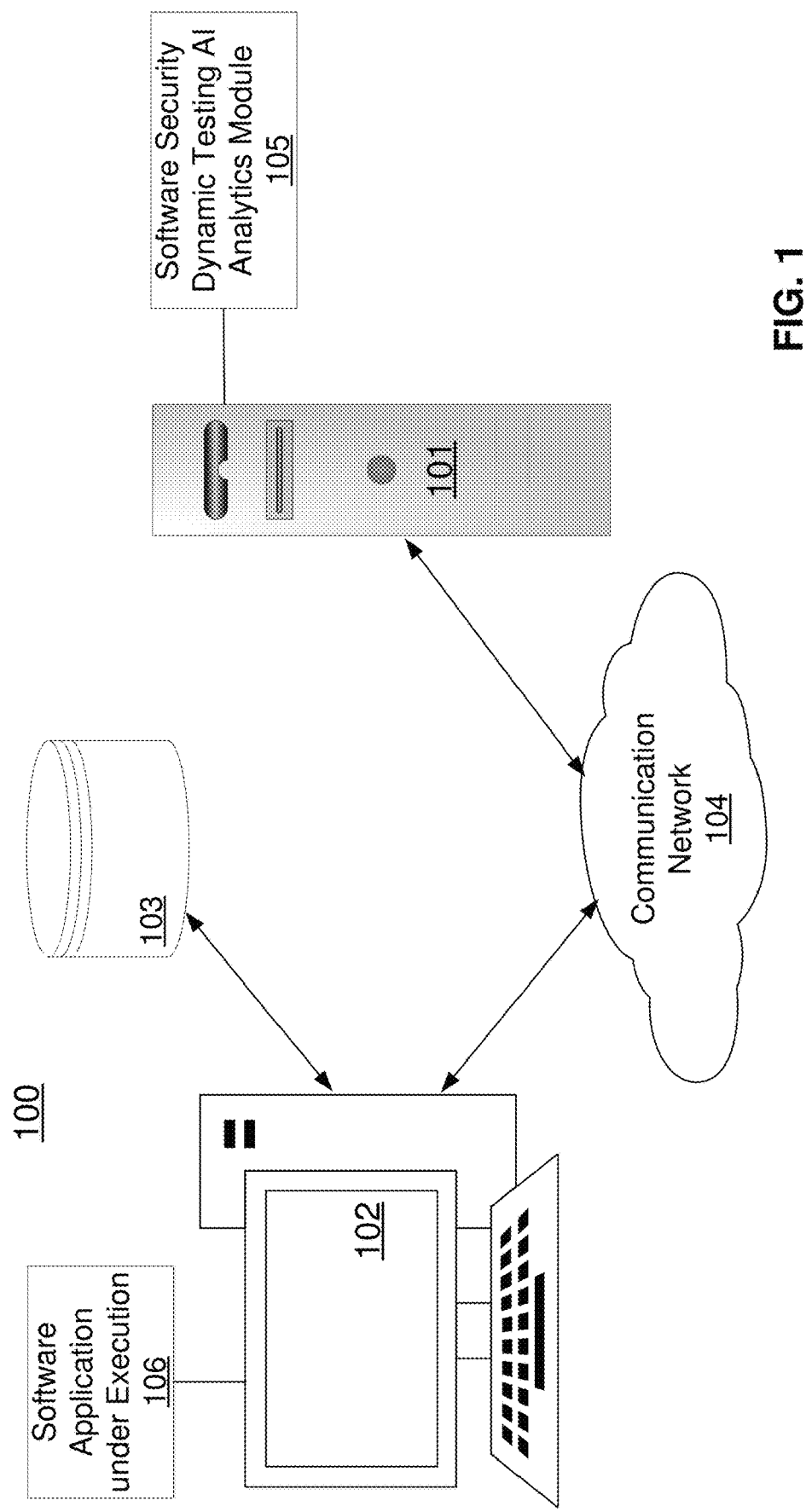
FIG. 1 illustrates, in an example embodiment, a cloud-based system for artificial intelligence (AI) based data analytics in software security dynamic testing of web-based software applications.

Methods and systems provided herein, among other advantages and benefits, to enable training of a machine learning neural network that accurately identifies software security vulnerability defects by reducing incidence of false positive results in dynamic testing for security vulnerability defects. Solutions herein provide accurate data analytics related to dynamic application security testing by subjecting the software application, while under execution, to directed attack vectors from a scanning application, and identifying vulnerability defects. As referred to herein, a software application includes web-based application programs as deployed, software as a service (SaaS), a cloud managed service provided application program.

In particular, methods and systems herein assess a dynamic security vulnerability during execution of software application or program in its running state. As used herein, the terms "software security vulnerability" or "security vulnerability" mean a programming error, feature or attribute that produces unintended behavior(s) and results in an application which may enable malicious code to bypass security features built into the application, whereupon, once the application's security features are bypassed, the malicious code can use the application as a gateway for appropriating or corrupting sensitive, protected, or confidential data.

The term "dynamic" as used herein refers to actions performed during real-time execution of the software program in one or more processors of a computing device for its intended purpose.

Dynamic security vulnerability or risk can be diagnosed based, in some embodiments, on attack vectors as provided herein, to induce erroneous or unexpected execution results in order to quantify a security risk associated with operation of a software product, such as a security risk associated with exploitation of a security vulnerability that is inherent to the software application. In this manner, accurately characterizing data analytics of security vulnerability defects associated with exploitation of a security vulnerability for a software application can contribute to more effectively identifying, prioritizing, managing and pre-empting security risks to an enterprise organization.

Accurate characterization of security vulnerability data analytics may be used to determine whether and to what extent to trust a web-based software application including software as a service (SaaS) applications, a website or similar infrastructure and software components, thus assisting and directing administrators or others to evaluate and improve the impact of changes within enterprise solutions.

As described herein, the neural networks, in embodiments, refer to an artificial intelligence (AI) based neural network, including machine learning (ML) or deep learning (DL) models. In a particular embodiment, the ML or neural network model herein may be implemented as a convolution neural network (CNN).

In accordance with a first example embodiment, provided is a method of implementing AI based neural networks for data analytics in dynamic testing of security vulnerability of cloud-based enterprise software applications. The method comprises directing, to a software program under execution, a series of attack vectors; diagnosing an at least a first set of results associated with the software program under execution as comprising one of a security vulnerability and not a security vulnerability, the at least a first set of results produced based at least in part on the attack vectors; and training a machine learning neural network classifier in accordance with a supervised classification that identifies false positive vulnerability defects of the at least a first set of results to produce a trained classifier, the neural network classifier including an input and an output layers connected via at least one intermediate layer that is configured in accordance with an initial matrix of weights.

In embodiments, training the neural network classifier comprises recursively adjusting the initial matrix of weights by backpropagation in diminishment of a number of the false positive vulnerability defects generated at the output layer in accordance with the supervised classification.

In some embodiments, diminishment of the number of false positive vulnerability defects proceeds, based on the recursively adjusting, in accordance with diminishment of an error matrix computed at the output layer of the neural network classifier.

In some aspects, the method further comprises deploying results of a subsequent dynamic testing case using the software program to the input layer of the trained classifier; and identifying a set of software security vulnerability defects of the subsequent dynamic testing case that are generated in accordance with the output layer of the trained classifier.

In further aspects, the deploying proceeds once the trained classifier produces a predetermined threshold percentage value of reduction in a number of false positive vulnerability defects associated with the initial matrix of weights.

In accordance with a second example embodiment, a non-transitory medium storing instructions executable in a processor of a server computing device is provided. The instructions are executable in a processor to: direct, to a software program under execution, a series of attack vectors; diagnose an at least a first set of results associated with the software program under execution as comprising one of a security vulnerability and not a security vulnerability, the at least a first set of results produced based at least in part on the attack vectors; and train a machine learning neural network classifier in accordance with a supervised classification that identifies false positive vulnerability defects of the at least a first set of results to produce a trained classifier, the neural network classifier including an input and an output layers connected via at least one intermediate layer that is configured in accordance with an initial matrix of weights.

In accordance with a third example embodiment, a server computing system implement AI or machine learning based data analytics for dynamic testing of security vulnerability of cloud- or web-based enterprise software applications is provided. The system comprises a server computing device that includes a memory storing instructions and one or more processors executing the instructions stored thereon to direct, to a software program under execution, a series of attack vectors; diagnose an at least a first set of results associated with the software program under execution as comprising one of a security vulnerability and not a security vulnerability, the at least a first set of results produced based at least in part on the attack vectors; and train a machine learning neural network classifier in accordance with a supervised classification that identifies false positive vulnerability defects of the at least a first set of results to produce a trained classifier, the neural network classifier including an input and an output layers connected via at least one intermediate layer that is configured in accordance with an initial matrix of weights.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device.

Furthermore, one or more embodiments described herein may be implemented through the use of logic instructions that are executable by one or more processors of a computing device, including a server computing device. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory. A server computing device as described herein utilizes processors, memory, and logic instructions stored on computer-readable medium. Embodiments described herein may be implemented in the form of computer processor-executable logic instructions or programs stored on computer memory mediums.

SYSTEM DESCRIPTION

FIG. 1 illustrates, in an example embodiment, a cloud-based system 100 for artificial intelligence (AI) based data analytics in software security dynamic testing of web-based software applications. Server computing system or server device 101, also referred to herein as server 101, includes software security dynamic testing AI analytics module 105 embodied according to computer processor-executable instructions stored within a non-transitory memory. Server 101 is in communication via communication network 104 with computing device 102. Computing device 102, which may be a server computing device in some embodiments, may host enterprise software program or application 106 for execution thereon. Software program 106 in another embodiment may be a web-based application program. Database 103, for example storing enterprise data accessible to software application 106 under execution, is communicatively accessible to computing device 102.

Figure 2:
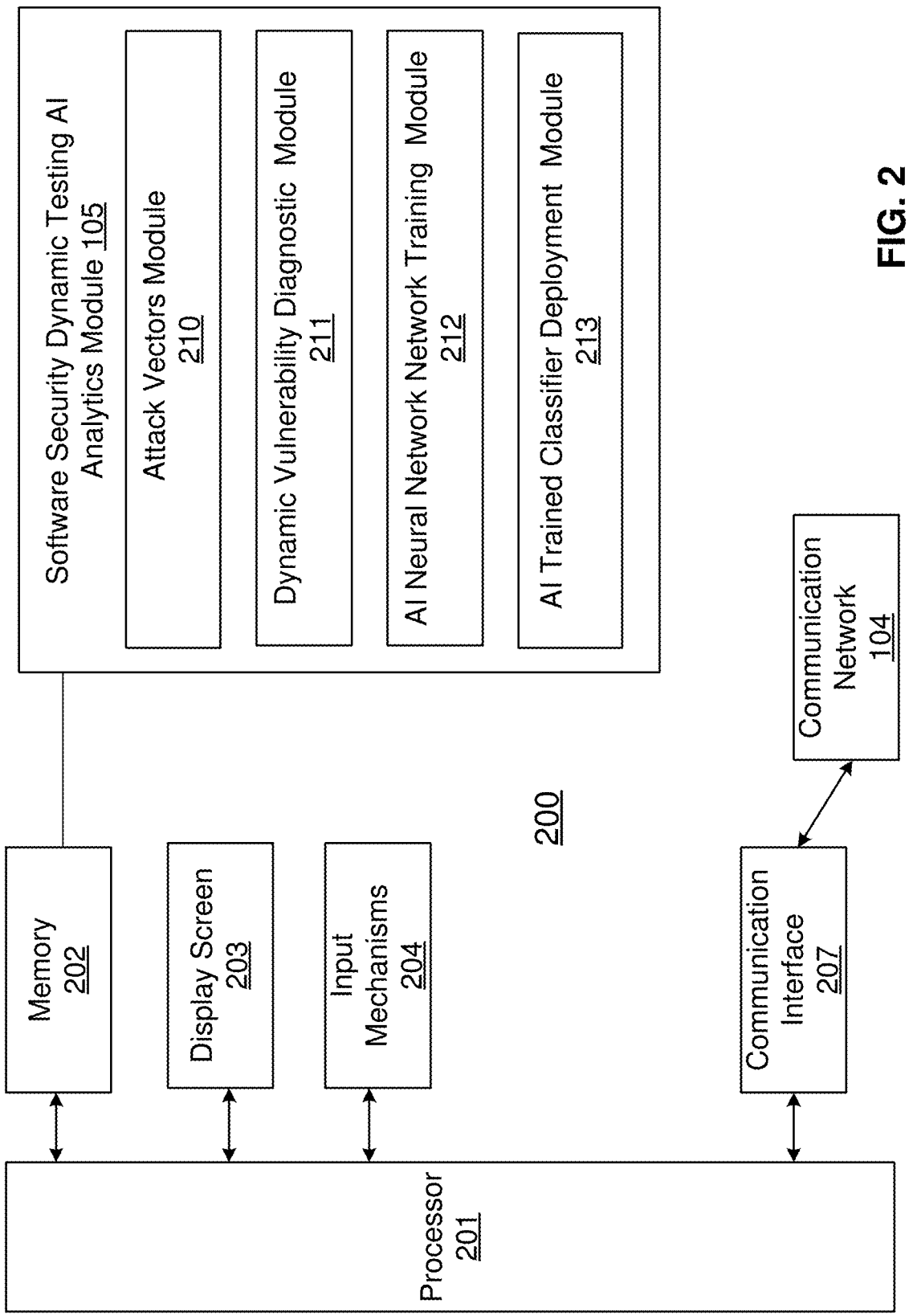
FIG. 2 illustrates, in one example embodiment, an architecture of a a cloud-based server computing system for artificial intelligence (AI) based data analytics in dynamic software security dynamic testing of web-based software applications.

FIG. 2 illustrates, in one example embodiment, an architecture 200 of a cloud-based server computing system for artificial intelligence (AI) based data analytics in dynamic software security dynamic testing of web-based software applications. Server computing system or device 101, also referred to herein as server 101, may include processor 201, memory 202, display screen 203, input mechanisms 204 such as a keyboard or software-implemented touchscreen input functionality, and communication interface 207 for communicating via communication network 104. Memory 202 may comprise any type of non-transitory system memory, storing instructions that are executable in processor 201, including such as a static random access memory (SRAM), dynamic random access memory (DRAM), synchronous DRAM (SDRAM), read-only memory (ROM), or a combination thereof.

Software security dynamic testing AI analytics module 105 includes processor-executable instructions stored in memory 202 of server 101, the instructions being executable in processor 201. Software security dynamic testing AI analytics module 105 may comprise portions or sub-modules including attack vectors module 210, dynamic vulnerability diagnostic module 211, AI neural network training module 212, and AI trained classifier deployment module 213.

Processor 201 uses executable instructions of attack vectors module 210 to direct, to a software program under execution, a series of attack vectors.

In an embodiment, the software program comprises a cloud based software program that is communicative accessible to the security assessing server during the execution. The scanning application at server 101 directing the attack vectors may have no foreknowledge of the execution attributes of the software application under execution. For example, the scanning application may not have, nor does it need, access to source code of the application under execution, but is configured by way of the attack vectors to detect vulnerabilities by actually performing attacks. Identifying and targeting the application may be based partly on having acquired no prior knowledge of execution attributes and source code of the software application. The terms "application" and "program" are used interchangeably herein.

A series of attack descriptions, or an attack vectors as referred to herein, constituted of script code in some embodiments, can be accessed from a data store such as a database or from memory 202 of server device 101. The attack description may be constituted of as a data set that encodes an attack or attempt to exploit a security vulnerability of the software program 106 under execution. For example, in embodiments, the attack description can include an identifier of a class or type of attack, a data value or group of data values that will be included within the attack data set, a reference to a particular attack data set, or a copy of an attack data set.

In an embodiment, one or more attack vectors of the series comprises a data set that encodes an attempt to exploit a security vulnerability aspect of the software application under execution.

In some variations, the data set may include one or more of an identifier of a class and a type of attack, a data value, a group of data values, a reference to a predetermined attack data set, and a copy of an attack data set.

Processor 201 uses executable instructions stored in dynamic vulnerability diagnostic module 211 to diagnose diagnosing an at least a first set of results associated with the software program under execution as comprising either a security vulnerability, or not a security vulnerability, the at least a first set of results produced based at least in part on the attack vectors In some aspects, the security vulnerability may relate to one or more of a cross-site scripting, a SQL injection, a path disclosure, a denial of service, a memory corruption, a code execution, a cross-site request forgery, a PHP injection, a Javascript injection and a buffer overflow.

In some embodiments, diagnosing a security vulnerability comprises the software application providing an error response indicating that at least one attack vector in the series of attack vectors successfully exploited a security vulnerability of the application.

In some cases, based on a result of the dynamic testing, a scanner in accordance with server 101 deploying the attack vectors may not report a dynamic security vulnerability for the application. In such cases, the application would have nullified the attack data set, thus pre-empting or preventing a security vulnerability, and accordingly provided an error response to indicate that a requested service or operation could not be executed because some input, for instance the attack data set, was improper. The dynamic security vulnerability diagnosis in this case would not report a security vulnerability for the application because the application did not use the attack data set in a manner that would allow exploitation of the targeted security vulnerability.

Processor 201 uses executable instructions stored in AI neural network training module 212 to implement training of a machine learning neural network classifier in accordance with a supervised classification that identifies false positive vulnerability defects of the at least a first set of results to produce a trained classifier, the neural network classifier including an input and an output layers connected via at least one intermediate layer that is configured in accordance with an initial matrix of weights. The term supervised classification as used herein refers to a supervised machine learning process which includes having a fully labeled set of data constituting known false positives while training the machine learning algorithm. Fully labeled means that each example in the training dataset is tagged with the finding of false positives that the algorithm, once trained as the matrix of weights is adjusted, should derive on its own.

To reduce incidences of false positive defect identifications, a training model may be implemented in accordance with executable instructions stored in AI neural network training module 212, in one embodiment configured with an input layer, an output layer, and one or more intermediate layers connecting the input and output layers.

In the particular embodiment of a convolution neural network model, the convolution operation typically embodies two parts of inputs: (i) input feature map data, and (ii) a weight (also referred to as output filter, or kernel). Given the input channel data with W(Width)×H(Height)×IC data cube and R×S×IC filter, the output of direct convolution may be formulated as:

$$y_{w,h} = \sum_{r=0}^{R-1}\sum_{s=0}^{S-1}\sum_{c=0}^{C-1} x_{(w+r),(h+s),c} * w_{r,s,c}$$

where:
X=input data/input feature/input feature map
w=width of the input or output data
h=height of the input or output data
R=weight size (width)
S=weight size (height)
C=number of input channel
Y=output data/output feature/output feature map
W=filter/kernel/weight For each input channel, the filter, or weight, are convoluted with data and generates output data. The same location of data of all the input channels are summed together and generate 1 output data channel.

A weight is applied to detect a particular defect feature or type based on an input data stream of security vulnerability defect results.

Each output channel of the convolution model is represented by an output filter or weight used to detect one particular feature or pattern of the input feature data stream. Convolution networks may be constituted of many output filters or weights for each layer of the convolution model corresponding to respective features or patterns in the data stream of vulnerability defect types or features.

In some embodiments, the neural network is one of a recurrent neural network and a convolution neural network. In a convolution neural network, each neural network intermediate layer may correspond to a respective security vulnerability defect type in accordance with the results of the software security dynamic testing. Examples of security vulnerability types, in some embodiments, may include cross-site scripting, SQL injection, path disclosure, a denial of service, a memory corruption, a code execution, a cross-site request forgery, a PHP injection, a Javascript injection and a buffer overflow.

In embodiments, training the neural network classifier comprises recursively adjusting the initial matrix of weights by backpropagation in diminishment of a number of the false positive vulnerability defects generated at the output layer in accordance with the supervised classification.

In some embodiments, the backpropagation comprises a backward propagation of errors in accordance with an error matrix as computed at the output layer, the errors being distributed backwards throughout the weights of the at least one neural network intermediate layer.

In some embodiments, diminishment of the number of false positive vulnerability defects proceeds, based on the recursively adjusting, in accordance with diminishment of an error matrix computed at the output layer of the neural network classifier.

Processor 201 uses executable instructions stored in AI trained classifier deployment module 213 to deploy results of a subsequent dynamic testing case of the software program to the input layer of the trained classifier, and to identify a set of software security vulnerability defects of the subsequent dynamic testing case that are generated in accordance with the output layer of the trained classifier.

In some aspects, the method further comprises deploying results of a subsequent dynamic testing case using the software program to the input layer of the trained classifier; and identifying a set of software security vulnerability defects of the subsequent dynamic testing case that are generated in accordance with the output layer of the trained classifier.

In other aspects, the deploying proceeds once the trained classifier produces a predetermined threshold percentage value of reduction in a number of false positive vulnerability defects associated with the initial matrix of weights.

Methodology

FIG. 3 illustrates a method 300 of operation, in one example embodiment, of a system for software security vulnerability data analytics in dynamic testing of software applications, method 300 being performed by one or more processors 201 of server computing device 101. In describing and performing the embodiments of FIG. 3, the examples of FIG. 1 and FIG. 2 are incorporated for purposes of illustrating suitable components or elements for performing a step or sub-step being described.

Examples of method steps described herein relate to the use of server 101 for implementing the techniques described. According to one embodiment, the techniques are performed by software security dynamic testing AI analytics module 105 of server 101 in response to the processor 201 executing one or more sequences of software logic instructions that constitute software security dynamic testing AI analytics module 105.

In embodiments, software security dynamic testing AI analytics module 105 may include the one or more sequences of instructions within sub-modules including attack vectors module 210, dynamic vulnerability diagnostic module 211 and AI neural network training module 212. Such instructions may be read into memory 202 from machine-readable medium, such as memory storage devices. In executing the sequences of instructions contained in attack vectors module 210, dynamic vulnerability diagnostic module 211 and AI neural network training module 212 of software security dynamic testing AI analytics module 105 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions.

At step 310, processor 201 executes instructions of attack vectors module 210 to direct, from security assessing server 101, a series of attack vectors to software program under execution 106 at computing device 102.

In an embodiment, the software program comprises a cloud based software program that is communicative accessible to the security assessing server during the execution. The scanning application at server 101 directing the attack vectors may have no foreknowledge of the execution attributes of the software application under execution. For example, the scanning application may not have access to source code of the application under execution, but is configured by way of the attack vectors to detect vulnerabilities by actually performing attacks. Identifying and targeting the application may be based partly on having acquired no prior knowledge of execution attributes and source code of the software application.

In some embodiments, a series of attack descriptions, or an attack vectors as referred to herein, constituted of script code, can be accessed from a data store such as a database or from memory 202 of server device 101. the attack description may be constituted of as a data set that encodes an attack or attempt to exploit a security vulnerability of the software program 106 under execution. For example, in embodiments, the attack description can include an identifier of a class or type of attack, a data value or group of data values that will be included within the attack data set, a reference to a particular attack data set, or a copy of an attack data set.

In an embodiment, one or more attack vectors of the series may include a data set that encodes an attempt to exploit a security vulnerability aspect of the software application under execution.

In some variations, the data set may include one or more of an identifier of a class and a type of attack, a data value, a group of data values, a reference to a predetermined attack data set, and a copy of an attack data set.

At step 320, processor 201 of server computing device 101 executes instructions included in dynamic vulnerability diagnostic module 211 to diagnose an at least a first set of results associated with the software program under execution as comprising either one of: a security vulnerability, or not a security vulnerability, the at least a first set of results being produced based at least in part on the attack vectors.

In some aspects, the security vulnerability may relate to one or more of a cross-site scripting, a SQL injection, a path disclosure, a denial of service, a memory corruption, a code execution, a cross-site request forgery, a PHP injection, a Javascript injection and a buffer overflow.

In some embodiments, diagnosing a security vulnerability comprises the software application providing an error response indicating that at least one attack vector in the series of attack vectors successfully exploited a security vulnerability of the application.

In some cases, based on a result of the dynamic testing, a scanner in accordance with server 101 deploying the attack vectors may not report a dynamic security vulnerability for the application. In such cases, the application would have nullified the attack data set, thus pre-empting or preventing a security vulnerability, and accordingly provided an error response to indicate that a requested service or operation could not be executed because some input, for instance the attack data set, was improper. The dynamic security vulnerability diagnosis in this case would not report a security vulnerability for the application because the application did not use the attack data set in a manner that would allow exploitation of the targeted security vulnerability.

At step 330, processor 201 executes instructions included in AI neural network training module 212, to implement training a machine learning neural network classifier in accordance with a supervised classification that identifies false positive vulnerability defects of the at least a first set of results to produce a trained classifier, the neural network classifier including an input and an output layers connected via at least one intermediate layer that is configured in accordance with an initial matrix of weights.

In some aspects, training the neural network classifier comprises recursively adjusting the initial matrix of weights by backpropagation in diminishment of a number of the false positive vulnerability defects generated at the output layer in accordance with the supervised classification.

In embodiments, diminishment of the number of false positive vulnerability defects proceeds, based on the recursively adjusting, in accordance with diminishment of an error matrix computed at the output layer of the neural network classifier.

At step 340, processor 210 may optionally execute instructions included in AI trained classifier deployment module 213 to deploy results of a subsequent dynamic testing case of the software program to the input layer of the trained classifier, and to identify a set of software security vulnerability defects of the subsequent dynamic testing case that are generated in accordance with the output layer of the trained classifier.

In further aspects, the deploying proceeds once the trained classifier produces a predetermined threshold percentage value of reduction in a number of false positive vulnerability defects associated with the initial matrix of weights. In an embodiment instance, the deploying proceeds once the trained classifier reaches at least an 80% reduction in the number false positive identifications associated with the initial matrix of weights of the intermediate layer of the classifier model, which may be a convolution neural network (CNN) in some embodiments.

The neural networks herein, in embodiments, refer to an artificial intelligence (AI) based neural network, including machine learning (ML) or deep learning (DL) models. In a particular embodiment, the ML or neural network model herein may be implemented as a convolution neural network (CNN).

It is contemplated that embodiments described herein extend to individual elements and concepts described herein, as well as for embodiments to include combinations of elements recited anywhere in this application. Although embodiments are described in detail herein with reference to the accompanying drawings, it is to be understood that the invention is not limited to only such example embodiments. As such, many modifications and variations will be apparent to practitioners skilled in the art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventors from claiming rights to such combinations.

What is claimed is:

1. A method of training a machine learning neural network, the method comprising:
   directing, from a security assessing server, to a software program under execution, a series of attack vectors;
   diagnosing, by a computer, an at least a first set of results associated with the software program under execution as comprising one of a security vulnerability and not a security vulnerability, the at least a first set of results produced based at least in part on the attack vectors;
   training a machine learning neural network classifier in accordance with a supervised classification that identifies false positive vulnerability defects of the at least a first set of results to produce a trained classifier, the neural network classifier including an input and an output layers connected via at least one intermediate layer that is configured in accordance with an initial matrix of weights;
   deploying results of a subsequent dynamic testing case using the software program to the input layer of the trained classifier; and
   identifying a set of software security vulnerability defects of the subsequent dynamic testing case that are generated in accordance with the output layer of the trained classifier;
   wherein the deploying proceeds once the trained classifier produces a predetermined threshold percentage value of reduction in a number of false positive vulnerability defects associated with the initial matrix of weights.

2. The method of claim 1 wherein training the neural network classifier comprises recursively adjusting the initial matrix of weights by backpropagation in diminishment of a number of the false positive vulnerability defects generated at the output layer in accordance with the supervised classification.

3. The method of claim 2 wherein diminishment of the number of false positive vulnerability defects proceeds, based on the recursively adjusting, in accordance with diminishment of an error matrix computed at the output layer of the neural network classifier.

4. The method of claim 1 wherein the software program under execution comprises a cloud based execution of at least one of a web based application and a software as a service (SaaS) enterprise application.

5. The method of claim 1 wherein at least one attack vector of the series comprises a data set that encodes an attempt to exploit a security vulnerability aspect of the software program under execution.

6. The method of claim 5 wherein the data set includes at least one of an identifier of a class and a type of attack, a data value, a group of data values, a reference to a predetermined attack data set, and a copy of an attack data set.

7. The method of claim 1 wherein the security vulnerability relates to at least one of a cross-site scripting, a SQL injection, a path disclosure, a denial of service, a memory corruption, a code execution, a cross-site request forgery, a PHP injection, a Javascript injection and a buffer overflow.

8. The method of claim 7 wherein the diagnosing of the security vulnerability comprises the software application providing an error response indicating that at least one attack vector in the series of attack vectors successfully exploited a security vulnerability of the software application.

9. A server computing system comprising:
   a processor;

a memory storing a set of instructions, the set of instructions being executable in the processor to cause operations comprising:
  directing, to a software program under execution, a series of attack vectors;
  diagnosing an at least a first set of results associated with the software program under execution as comprising one of a security vulnerability and not a security vulnerability, the at least a first set of results produced based at least in part on the attack vectors;
  training a machine learning neural network classifier in accordance with a supervised classification that identifies false positive vulnerability defects of the at least a first set of results to produce a trained classifier, the neural network classifier including an input and an output layers connected via at least one intermediate layer that is configured in accordance with an initial matrix of weights;
  deploying results of a subsequent dynamic testing case using the software program to the input layer of the trained classifier; and
  identifying a set of software security vulnerability defects of the subsequent dynamic testing case that are generated in accordance with the output layer of the trained classifier;
  wherein the deploying proceeds once the trained classifier produces a predetermined threshold percentage value of reduction in a number of false positive vulnerability defects associated with the initial matrix of weights.

10. The system of claim 9 wherein training the neural network classifier comprises recursively adjusting the initial matrix of weights by backpropagation in diminishment of a number of the false positive vulnerability defects generated at the output layer in accordance with the supervised classification.

11. The system of claim 10 wherein diminishment of the number of false positive vulnerability defects proceeds, based on the recursively adjusting, in accordance with diminishment of an error matrix computed at the output layer of the neural network classifier.

12. The system of claim 9 wherein the software program under execution comprises a cloud based execution of at least one of a web based application and a software as a service (SaaS) enterprise application.

13. The system of claim 9 wherein at least one attack vector of the series comprises a data set that encodes an attempt to exploit a security vulnerability aspect of the software application under execution.

14. The system of claim 13 wherein the data set includes at least one of an identifier of a class and a type of attack, a data value, a group of data values, a reference to a predetermined attack data set, and a copy of an attack data set.

15. The system of claim 9 wherein the security vulnerability relates to at least one of a cross-site scripting, a SQL injection, a path disclosure, a denial of service, a memory corruption, a code execution, a cross-site request forgery, a PHP injection, a Javascript injection and a buffer overflow.

16. The system of claim 15 wherein the diagnosing of the security vulnerability comprises the software application providing an error response indicating that at least one attack vector in the series of attack vectors successfully exploited a security vulnerability of the software application.

* * * * *